United States Patent Office 3,184,424
Patented May 18, 1965

3,184,424
METHOD OF MAKING A SYNTHETIC RUBBER LATEX EMPLOYING AN ALKALI POLYACRYLATE
Victor S. Chambers, Naugatuck, and Louis H. Howland, Watertown, Conn., assignors to United States Rubber Company, New York, N.Y., a corporation of New Jersey
No Drawing. Filed Sept. 26, 1961, Ser. No. 140,697
8 Claims. (Cl. 260—29.7)

This invention relates to the preparation of synthetic rubber latices of large particle size, particularly to permit them to be concentrated to fluid latices of high solids content.

We have found that in polymerizing at 0° C. to 15° C. an aqueous emulsion of synthetic rubber forming monomeric material containing 2 to 10 parts of water-soluble soap emulsifier per 100 parts of synthetic rubber forming monomeric material, a latex of greatly increased particle size will be produced if there is present during conversion of at least 10% of the original synthetic rubber forming monomers 0.1 to 2 parts of alkali polyacrylate per 100 parts of the original synthetic rubber forming monomeric material. Latices thus prepared will conventionally have a solids content of 20% to 50% and may be concentrated to a solids content of 55% to 70%, giving a fluid high solids latex. The latex may be concentrated by increasing the solids content in known manner as by creaming with a vegetable mucilage, such as ammonium alginate. It is preferred, however, to increase the solids content by evaporation concentration. The emulsion of synthetic rubber forming monomeric material is polymerized to a conversion of at least 60% and may be polymerized to substantially complete conversion (100%). The alkali polyacrylate may be incorporated in the original monomer recipe, or may be added at any time during the polymerization provided conversion of at least 10% of the monomeric material to polymer takes place after the addition of the alkali polyacrylate, e.g., if the latex is to be shortstopped at 70% conversion, the alkali polyacrylate should be added not later than at 60% conversion so that conversion of at least 10% of the synthetic rubber forming monomeric material to synthetic rubber will take place in the presence of the alkali polyacrylate. Any residual synthetic rubber forming monomeric material remaining after the desired conversion of monomers to synthetic rubber may be removed from the latex in the usual manner of venting off gaseous monomers and steam or vacuum distilling higher boiling monomers.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3, with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex." The polymerization recipe will contain as an emulsifier 2% to 10% of water-soluble soap based on the weight of synthetic rubber forming monomeric material. Such soap may be one or a mixture of water-soluble soaps of soap-forming monocarboxylic acids, such as alkali-metal, ammonium and amine salts of higher fatty acids having 10 to 24 carbon atoms in the molecule, or of rosin acids, including dehydrogenated, hydrogenated and disproportionated rosin acids. The polymerization recipe may, if desired, also contain up to 5% based on the weight of synthetic rubber forming monomeric material of other anionic surface-active dispersing agents which are sulfonated or sulfated compounds having the general formula $R—SO_3M$ or $R—OSO_3M$, where M represents alkali-metal, ammonium or amine radical, and R represents an organic radical containing a group having 9 to 23 carbon atoms, such as alkyl sulfonates, e.g., dodecyl sodium sulfonate; alkyl sulfates, e.g., sodium oleyl sulfate; alkyl aryl sulfonates, e.g., dodecyl benzene sulfonate; alkyl sulfosuccinates, e.g., dioctyl sodium sulfosuccinate; aryl sulfonate-formaldehyde condensation products, e.g., condensation product of sodium naphthalene sulfonate and formaldehyde. The alkali polyacrylate is not the emulsifier for the rubber forming monomers but is in addition to the usual 2 to 10 parts of water-soluble soap emulsifier, and such other anionic surface-active dispersing agent as may be present.

The alkali (alkali metal or ammonium) polyacrylates are water-soluble salts of polymerized acrylic acid, and may be added in water solution to the initial aqueous emulsion of monomers or to the latex during polymerization, or the alkali polyacrylate may be formed in situ by adding the polyacrylic acid to the alkaline monomer emulsion or to the partially polymerized alkaline latex. Such alkali polyacrylate, or polyacrylic acid, may be mixed with soap and/or other anionic surface-active agents such as the above described sulfated or sulfonated compounds, before adding to the polymerization recipe or the partially polymerized latex, if desired.

The following examples illustrate the invention. All parts and percentages referred to herein are by weight.

*Example 1*

Four 24-ounce glass bottle reactors (runs A, B, C and D) were loaded with the following ingredients: 70 parts of butadiene-1,3; 30 parts of styrene; 0.20 part of sodium formaldehyde sulfoxylate; 0.15 part of diisopropylbenzene hydroperoxide; 0.015 part of ferrous sulfate heptahydrate; 0.030 part of the tetrasodium salt of ethylene diamine tetraacetic acid; 4.0 parts of potassium oleate; 1.0 part of a condensation product of sodium naphthalene sulfonate and formaldehyde; 0.5 part of potassium sulfate, 0.03 part of sodium dithionite; and 0.1 part of tertiary dodecyl mercaptan. Runs A and B were also charged with 100 parts of water, and runs C and D with 130 parts of water. The mixtures were agitated by end over end rotation at 5° C.

At 75% conversion of run A, there was added 0.5 part of sodium polyacrylate and 0.5 part of a condensation product of sodium naphthalene sulfonate and formaldehyde, in 50 parts of water. At 44% conversion of run B, there was added 0.5 part of potassium polyacrylate, 0.5 part of a condensation product of sodium naphthalene sulfonate and formaldehyde, and 1 part of potassium oleate, in 50 parts of water. At 71% conversion of run C, there was added 0.5 part of a condensation product of sodium naphthalene sulfonate and formaldehyde in 20 parts of water. At 70% conversion of run D, there was added 0.5 part of a condensation product of sodium naphthalene sulfonate and 1 part of potassium oleate in 20 parts of water. The polymerizates of runs A, B, C and D were shortstopped by addition of 0.2 part of potassium dimethyl dithiocarbamate at 93%, 97%, 97% and 96% conversions, respectively, and unreacted butadiene was vented off, giving latices of run A of about 40% and runs B, C and D of about 41% solids.

The average particle diameters of the latices of runs A, B, C and D were 1120, 1140, 520 and 550 angstrom units, respectively, illustrating the great increase in particle size on polymerizing synthetic rubber forming monomers in the presence of alkali polyacrylate. The latices of runs A and B may readily be concentrated, preferably by evaporation concentration, to fluid latices of 55% to 70% solids content.

*Example 2*

This example shows that alkali polyacrylate, which is a known thickener for synthetic rubber latex, does not increase the particle size of synthetic rubber latex on addition to the finished latex.

A commercial latex polymerized at 5° C. with the following recipe was used, the figures representing parts by weight: butadiene 73.3, styrene 26.7, diethylene triamine 0.11, di-isopropylbenzene hydroperoxide 0.20, ferrous sulfate heptahydrate 0.004, tetrasodium salt of ethylene diamine tetraacetic acid 0.016, potassium fatty acid soap 5.5, potassium hydroxide 0.021, a condensation product of sodium naphthalene sulfonate and formaldehyde 0.12, potassium chloride 0.47, sodium hydrosulfate 0.03, mixed tertiary ($C_{12}$ to $C_{16}$) mercaptans 0.035, and water 165. This was shortstopped at about 60% conversion with 0.15 part of potassium dimethyl dithiocarbamate. Unreacted butadiene was vented off and unreacted residual styrene was removed by steam distillation in the conventional manner. The resulting latex contained 40.9% solids.

To four 122.5 gram portions E, F, G and H of this latex was added 0.1 part, 0.5 part, 1.0 part and 2.0 parts, respectively, of sodium polyacrylate as a 5% aqueous solution. There was no immediate apparent change in Sample E, but Samples F, G and H became more viscous within a few minutes. After a period of five days the average particle diameters of the latices of Samples E, F, G and H were all 760 to 770 angstroms, while the untreated latex had an average particle diameter of 770. This shows that the addition of sodium polyacrylate to a finished latex does not increase the particle size.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of making a synthetic rubber latex which comprises polymerizing at 0° C. to 15° C. an aqueous emulsion of synthetic rubber forming monomeric material containing 2 to 10 parts of a water-soluble soap of soap-forming monocarboxylic acid per 100 parts of synthetic rubber forming monomeric material to a latex of 60% to substantially complete conversion, and having present during conversion of at least 10% of the original synthetic rubber forming monomeric material 0.1 to 2 parts of alkali polyacrylate per 100 parts of the original synthetic rubber forming monomeric material, said synthetic rubber forming monomeric material being selected from the group consisting of butadienes-1,3 and mixtures of butadienes-1,3 with up to 70% of such mixtures of monoethylenic compounds which contain a $CH_2=C<$ group and are copolymerizable with butadienes-1,3.

2. The method of making a synthetic rubber latex which comprises polymerizing at 0° C. to 15° C. an aqueous emulsion of synthetic rubber forming monomeric material containing 2 to 10 parts of a water-soluble soap of soap-forming monocarboxylic acid per 100 parts of synthetic rubber forming monomeric material to a latex of 60% to substantially complete conversion and having present during conversion of at least 10% of the original synthetic rubber forming monomeric material 0.1 to 2 parts of sodium polyacrylate per 100 parts of the original synthetic rubber forming monomeric material, said synthetic rubber forming monomeric material being selected from the group consisting of butadienes-1,3 and mixtures of butadienes-1,3 with up to 70% of such mixtures of monoethylenic compounds which contain a $CH_2=C<$ group and are copolymerizable with butadienes-1,3.

3. The method of making a synthetic rubber latex which comprises polymerizing at 0° C. to 15° C. an aqueous emulsion of synthetic rubber forming monomeric material containing 2 to 10 parts of a water-soluble soap of soap-forming monocarboxylic acid per 100 parts of synthetic rubber forming monomeric material to a latex of 60% to substantially complete conversion, and having present during conversion of at least 10% of the original synthetic rubber forming monomeric material 0.1 to 2 parts of potassium polyacrylate per 100 parts of the original synthetic rubber forming monomeric material, said synthetic rubber forming monomeric material being selected from the group consisting of butadienes-1,3 and mixtures of butadienes-1,3 with up to 70% of such mixtures of monoethylenic compounds which contain a $CH_2=C<$ group and are copolymerizable with butadienes-1,3.

4. The method of making a synthetic rubber latex which comprises polymerizing at 0° C. to 15° C. an aqueous emulsion of a mixture of butadiene-1,3 and styrene containing 2 to 10 parts of a water-soluble soap of soap forming monocarboxylic acid per 100 parts of said mixture of butadiene-1,3 and styrene to a latex of 60% to substantially complete conversion, and having present during conversion of at least 10% of the original butadiene-1,3 and styrene mixture 0.1 to 2 parts of alkali-metal polyacrylate per 100 parts of the original butadiene-1,3 and styrene mixture.

5. The method of making a concentrated synthetic rubber latex which comprises polymerizing at 0° C. to 15° C. an aqueous emulsion of synthetic rubber forming monomeric material containing 2 to 10 parts of a water-soluble soap of soap-forming monocarboxylic acid per 100 parts of synthetic rubber forming monomeric material to a latex of 60% to substantially complete conversion and a solids content of 20% to 50%, and having present during conversion of at least 10% of the original synthetic rubber forming monomeric material 0.1 to 2 parts of alkali polyacrylate per 100 parts of the original synthetic rubber forming monomeric material, and concentrating the latex to a solids content of 55% to 70%, said synthetic rubber forming monomeric material being selected from the group consisting of butadienes-1,3 and mixtures of butadienes-1,3 with up to 70% of such mixtures of monoethylenic compounds which contain a $CH_2=C<$ group and are copolymerizable with butadienes-1,3.

6. The method of making a concentrated synthetic rubber latex which comprises polymerizing at 0° C. to 15° C. an aqueous emulsion of synthetic rubber forming monomeric material containing 2 to 10 parts of a water-soluble soap of soap-forming monocarboxylic acid per 100 parts of synthetic rubber forming monomeric material to a latex of 60% to substantially complete conversion and a solids content of 20% to 50%, and having present during conversion of at least 10% of the original synthetic rubber forming monomeric material 0.1 to 2 parts of alkali-metal polyacrylate per 100 parts of the original synthetic rubber forming monomeric material, and evaporating water from the latex until the latex is concentrated to a solids content of 55% to 70%, said synthetic rubber forming monomeric material being selected from the group consisting of butadienes-1,3 and mixtures of butadienes-1,3 with up to 70% of such mixtures of monoethylenic compounds which contain a $CH_2=C<$ group and are copolymerizable with butadienes-1,3.

7. The method of making a concentrated synthetic rubber latex which comprises polymerizing at 0° C. to 15° C. an aqueous emulsion of a mixture of butadiene- 1,3 and styrene containing 2 to 10 parts of a water-soluble soap of soap forming monocarboxylic acid per 100 parts of said mixture of butadiene-1,3 and styrene to a latex of 60% to substantially complete conversion and a solids content of 20% to 50%, and having present during conversion of at least 10% of the original butadiene-1,3 and styrene mixture 0.1 to 2 parts of sodium polyacrylate per 100 parts of the original butadiene-1,3 and styrene mixture, and evaporating water from the latex until the latex is concentrated to a solids content of 55% to 70%.

8. The method of making a concentrated synthetic rubber latex which comprises polymerizing at 0° C. to 15° C. an aqueous emulsion of a mixture of butadiene-1,3 and styrene containing 2 to 10 parts of a water-soluble soap of soap forming monocarboxylic acid per 100 parts of said mixture of butadiene-1,3 and styrene to a latex of 60% to substantially complete conversion and a solids content of 20% to 50%, and having present during conversion of at least 10% of the original butadiene-1,3 and styrene mixture 0.1 to 2 parts of potassium polyacrylate per 100 parts of the original butadiene-1,3 and styrene mixture, and evaporating water from the latex until the latex is concentrated to a solids content of 55% to 70%.

References Cited by the Examiner

UNITED STATES PATENTS

| | | | |
|---|---|---|---|
| 2,138,073 | 11/38 | Schweitzer | 18—50 |
| 2,587,562 | 2/52 | Wilson | 260—94.2 |
| 3,004,938 | 10/61 | Chambers et al. | 260—17 |
| 3,054,762 | 9/62 | Rees | 260—29.7 |

MURRAY TILLMAN, *Primary Examiner.*

LEON J. BERCOVITZ, WILLIAM H. SHORT,
*Examiners.*